L. G. GARRETT.
FINGER GUIDE FOR STRINGED INSTRUMENTS.
APPLICATION FILED APR. 15, 1909.
992,765. Patented May 23, 1911.
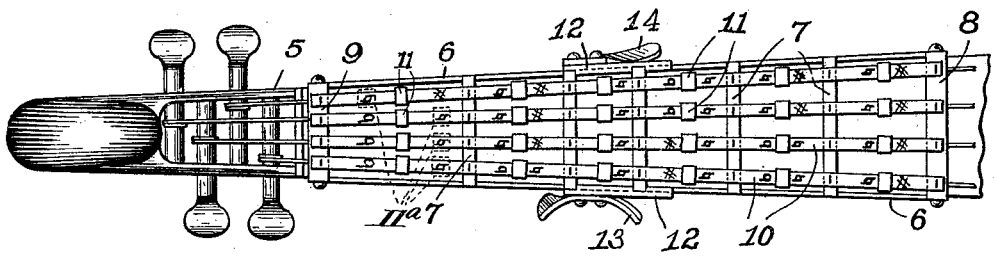
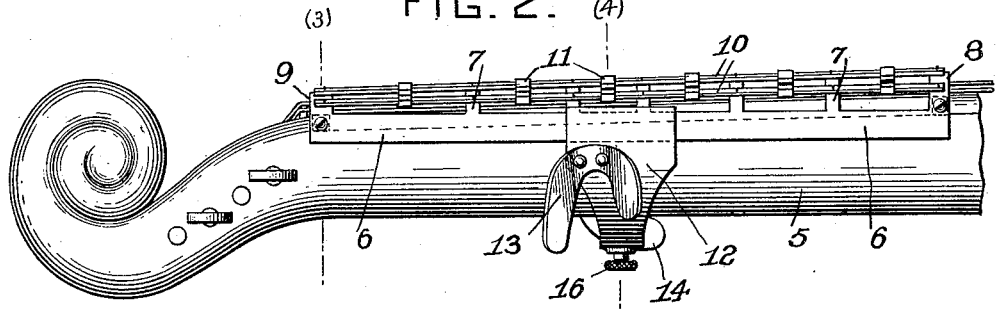
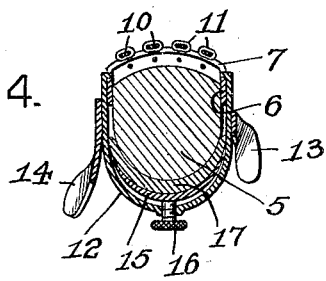
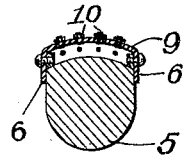

UNITED STATES PATENT OFFICE.

LEBBEUS G. GARRETT, OF WASHINGTON, PENNSYLVANIA.

FINGER-GUIDE FOR STRINGED INSTRUMENTS.

992,765.  Specification of Letters Patent.  Patented May 23, 1911.

Application filed April 15, 1909. Serial No. 489,993.

*To all whom it may concern:*

Be it known that I, LEBBEUS G. GARRETT, a citizen of the United States, residing at Washington, in the State of Pennsylvania, have invented a certain new and useful Finger-Guide for Stringed Instruments, of which the following is a specification.

My invention relates to means for facilitating the playing of stringed instruments, and particularly comprises means to assist a beginner by enabling the proper placing of the fingers on the finger-board, and the proper holding of the instrument in the hand. Its primary object is to enable the student to learn accuracy from the first, and to mechanically guide him in correct operation.

I have illustrated the invention in a simple form as applied to a violin, in the accompanying drawing, wherein—

Figure 1 is a plan view of the finger-board end of a violin with the attachment in place thereon, and Fig. 2 is a side elevation of the same. Figs. 3 and 4 are cross-sections respectively on the lines (3) and (4) in Fig. 2.

The principal difficulty encountered by the beginner in playing any stringed instrument, is the proper holding of the hand and the proper placing of the fingers to make the different notes with ease and accuracy. In a violin especially it is difficult to learn to instinctively place the fingers at the proper place on the finger-board to get an accurate note, and to find the position of the different notes.

My invention supplies a mechanical means for forcing the student to hold his hand in proper position, and at the same time rendering it easy for him to both see and feel the places for the different fingers in the different keys in which the music may be played.

In the figures the neck of the instrument 5 is embraced by a guide composed of a frame 6 having cross-bars 7, along the sides and end-bars 8 and 9 adapted to fit the neck. Supported by the cross-bars are spring supports 10, which may be made conveniently of elastic braid and on these are a series of movable stops 11 which are conveniently made of pieces of flattened rubber tubing. The elastic straps 10 and therefore the stops 11 lie in line directly over the strings. The frame is held in place by a strap 12 embracing the neck of the instrument and attachable at various points on the frame by notches engaging the cross-bars 7 and by flanges lying over the upper edges of frame-bar 6, as appears in Fig. 1. This strap 12 has on the back-side a projecting lug 13 adapted to hold the operator's thumb in proper position, and on the front-side a lug 14 to prevent the palm of the hand getting out of position. Within the strap 12 there is a pad to hold the frame securely and resiliently. This may be formed as a rubber cushion 17 held in a yoke 15 which if desired may be adjusted in position by a screw 16.

The resilient supporting straps 10 are marked as shown with the signs for the position of the stops in making the natural, sharp, and flat notes, and it will be observed that there are marked several positions for each set of stop 11. The player therefore changes the key by sliding the stops to the positions of the notes as marked, and as indicated by the music. For example, the first set of stops would be placed as indicated by dotted lines at 11$^a$ for the natural key. Thereupon when any one of the stops is pushed down by the finger it engages the string and makes the required note as will be well understood by those familiar with the art. The operator is by this means forced to hold his fingering hand correctly, and will soon learn to instinctively place his fingers at the proper position. When the guide is discarded there is no change whatever in the manner of operating and the mechanical device therefore does not interfere with learning the art by the usual methods. In the meantime the beginner will have trained his ear to recognize accurate notes and will the more easily detect his own errors in playing without the guide.

Other advantages of the device will readily occur to those familiar with the art.

I claim as my invention:

1. A finger guide for stringed instruments having individually adjustable stops to indicate the position of the fingers in playing in various keys, and a guide for the position of the hand, shiftably mounted upon the instrument.

2. A finger guide for stringed instruments having resiliently mounted stops supported over the finger-board and adapted to be individually shifted to different positions for different keys, substantially as described.

3. The combination with an adjustable finger guide for stringed instruments, of a hand guide mounted upon said finger guide and capable of being shifted to different positions when playing in different keys.

4. The combination with a stringed instrument having a plain finger-board, of a finger guide removably attached to the finger-board, and a hand guide adjustably mounted on the finger guide.

5. An attachment for stringed musical instruments comprising a frame attachable to the finger-board, adjustable stops resiliently mounted on the frame, and a hand guide adjustably mounted on said frame.

6. A finger guide for stringed instruments having several sets of individually shiftable finger stops, and supports for said stops lying over the strings and marked with the positions for the stops to indicate the notes in different keys.

7. A violin attachment comprising a rigid frame adapted for removable attachment to the violin neck, resilient supports on said frame lying over the strings, and several sets of individually shiftable finger stops on said supports, whereby the position for the fingers may be indicated for any key.

In testimony whereof I have hereunto signed my name in the presence of the two subscribing witnesses.

LEBBEUS G. GARRETT.

Witnesses:
F. W. H. CLAY,
H. M. WILLIS.

Copies of this patent may be obtained for five cents each, by addressing the "Commissioner of Patents, Washington, D. C."